July 4, 1939.  A. B. FALKNER  2,164,907
FISHHOOK DISGORGING DEVICE
Filed Aug. 22, 1938
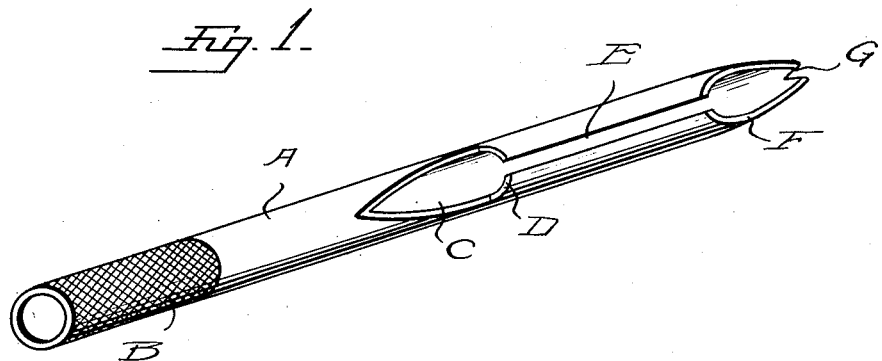
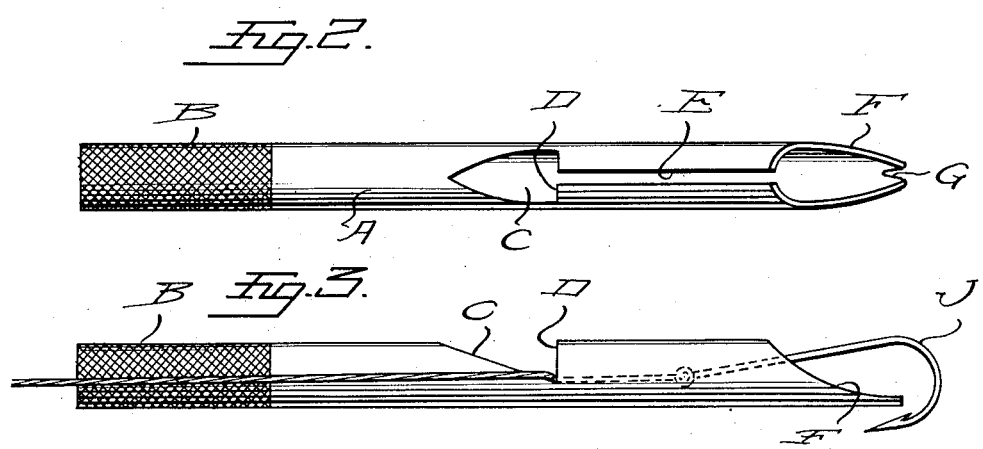
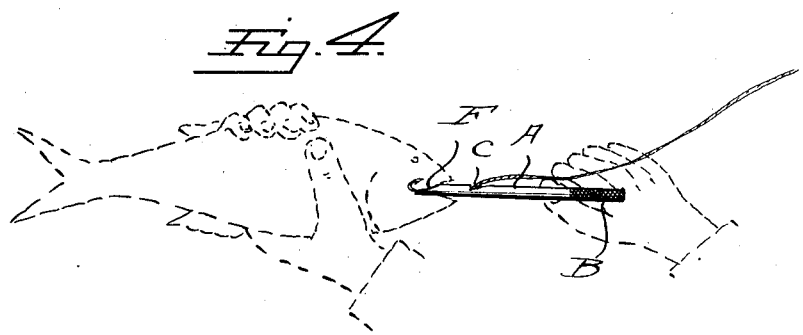
Inventor
Arthur B. Falkner
By Wm. L. Moore
Attorney Patented July 4, 1939

2,164,907

UNITED STATES PATENT OFFICE 2,164,907

FISHHOOK DISGORGING DEVICE

Arthur Brantley Falkner, Nashville, Tenn.

Application August 22, 1938, Serial No. 226,193

2 Claims. (Cl. 43—29)

My invention relates to improvements in fish hook disgorging devices, and one object of my invention is the provision of an extremely simple and inexpensive device which will enable the fisherman to quickly detach or remove the hook from the mouth of the fish.

Another object of my invention is the provision of a fish hook disgorging or detaching device which will be of very small and compact construction and which can be instantly applied to the fish line and operated with ease to remove the hook from the mouth of the fish.

Another object of my invention is the provision of a device for detaching the hook from the mouth of the fish which will be absolutely efficient and reliable for the service intended, and which will be a practical necessity for the use of the fisherman.

With these objects in view my invention consists of a device of the character and for the purpose stated embodying novel details of construction and arrangement of parts substantially as described and claimed and as shown in the accompanying drawing, in which:

Figure 1 represents a perspective view of the fish hook disgorging or detaching device constructed in accordance with and embodying my invention.

Figure 2 represents a top plan view of the device.

Figure 3 represents a side view or elevation of the device with the fish hook and line shown in proper relation in the device.

Figure 4 represents a perspective view of the device shown in position for use.

My invention is the embodiment of simplicity and inexpensiveness, and comprises a tube or barrel A, of suitable size having the inner knurled end B and intermediately provided with the cut-out portion C, having the straight walls D, and the slot E, and having its outer end tapered at F and provided with the notch or recess G.

The construction of my invention will be readily understood from the drawing and description and in use the fishing line H passes along the upper side of the tube down through the slot E with its hook J disposed as shown in Figure 3 so that when the line is in this position and the device is pushed forward the hook is drawn from the mouth of the fish into the recess or notch G, all as clearly shown in Figure 3 above referred to.

From the foregoing description taken in connection with the drawing, it will be evident that I provide a most useful and desirable article or device for the use of the fisherman which will save much time and inconvenience in removing the fish hook from the mouth of the fish, and the fact that it is of such simple and inexpensive construction makes the article a practical necessity for the sportsman or fisherman.

I claim:

1. A fish hook disgorging or detaching device, comprising a tube or barrel having an intermediate line guiding portion, a slot contiguous to said guiding portion to receive the line, and a tapered outer end or terminal, said taper of the outer end extending downwardly.

2. A fish hook disgorging or detaching device, comprising a tube or barrel having an intermediate line guiding portion, a slot continuous to said guiding portion to receive the line, and a tapered outer end or terminal having a notch or recess to receive the fish hook.

ARTHUR BRANTLEY FALKNER.